United States Patent
Ahmed

(10) Patent No.: US 11,983,272 B2
(45) Date of Patent: May 14, 2024

(54) METHOD AND SYSTEM FOR DETECTING AND PREVENTING APPLICATION PRIVILEGE ESCALATION ATTACKS

(71) Applicant: Saudi Arabian Oil Company, Dhahran (SA)

(72) Inventor: Urfan Ahmed, Province (SA)

(73) Assignee: Saudi Arabian Oil Company, Dhahran (SA)

( * ) Notice: Subject to any disclaimer, the term of this patent is extended or adjusted under 35 U.S.C. 154(b) by 362 days.

(21) Appl. No.: 17/375,341

(22) Filed: Jul. 14, 2021

(65) Prior Publication Data

US 2023/0019015 A1     Jan. 19, 2023

(51) Int. Cl.
*G06F 21/56* (2013.01)
*G06F 9/54* (2006.01)
*G06N 20/00* (2019.01)

(52) U.S. Cl.
CPC .............. *G06F 21/566* (2013.01); *G06F 9/54* (2013.01); *G06N 20/00* (2019.01); *G06F 2221/034* (2013.01)

(58) Field of Classification Search
CPC .... G06F 21/566; G06F 9/54; G06F 2221/034; G06N 20/00
USPC .......................................................... 726/23
See application file for complete search history.

(56) References Cited

U.S. PATENT DOCUMENTS

| | | | |
|---|---|---|---|
| 6,279,111 B1 | 8/2001 | Jansenworth et al. | |
| 8,196,178 B2 | 6/2012 | Lambert et al. | |
| 8,955,104 B2 | 2/2015 | Arbaugh et al. | |
| 9,092,625 B1* | 7/2015 | Kashyap | G06F 21/52 |
| 9,195,823 B1 | 11/2015 | Binotto et al. | |
| 10,277,618 B1 | 4/2019 | Wu et al. | |
| 10,284,591 B2 | 5/2019 | Giuliani et al. | |
| 2016/0142410 A1 | 5/2016 | Mazzara, Jr. | |
| 2016/0328561 A1* | 11/2016 | Tamir | G06F 21/552 |
| 2017/0161495 A1* | 6/2017 | Viswanath | G06F 21/566 |
| 2017/0289191 A1 | 10/2017 | Thioux et al. | |
| 2018/0276383 A1* | 9/2018 | Venkataramani | G06F 9/468 |
| 2019/0268152 A1 | 8/2019 | Sandoval et al. | |
| 2019/0311115 A1 | 10/2019 | Lavi et al. | |

(Continued)

FOREIGN PATENT DOCUMENTS

WO     20141463029 A1     9/2014

*Primary Examiner* — Jacob Lipman
(74) *Attorney, Agent, or Firm* — Dinsmore & Shohl LLP

(57) ABSTRACT

Privilege escalation monitoring may include initiating a learning mode, recording application attributes of one or more applications on a host system to an application repository, recording process attributes of one or more running processes on the host system to an access repository, recording API calls of the one or more running processes on the host system to an API repository, terminating the learning mode, initializing a protecting mode, identifying running processes on the host system based on records in the application repository, determining whether the identified running processes have system access violations based on the application repository, determining whether the identified running processes have file permission escalations based on the access repository, determining whether the identified running processes have failed privileged API calls based on the API repository, generating an alert and terminating an offending process corresponding to the determinations.

17 Claims, 7 Drawing Sheets

(56) References Cited

U.S. PATENT DOCUMENTS

2019/0325133 A1   10/2019  Goodridge et al.
2020/0082094 A1*  3/2020   Mcallister ................ G06F 8/77

* cited by examiner

METHOD AND SYSTEM FOR DETECTING AND PREVENTING APPLICATION PRIVILEGE ESCALATION ATTACKS

TECHNICAL FIELD

The present disclosure relates to computer system security. Particularly, the present disclosure relates to computer devices and methods of detecting and preventing privilege escalation attacks on computer systems.

BACKGROUND

Computer operating systems (OS) may include a hierarchy of permission levels for various components of the operating system and/or file system as a means of securing processes and information on the computer. For example, in the Microsoft Windows OS, the OS may have user privileges ranging from Administrator, which holds unrestricted access to the system, to System, which holds access to particular system functions, to User, which holds substantially curtailed access to the system, to Guest, which is limited even further to just basic application access, and other more granular privileges. Privilege escalation attacks are attacks that obtain unauthorized access within a computer by progressively gaining higher-level permissions. To obtain higher-level permissions, an attacker may take advantage of a flaw in an application on the computer (i.e., utilize an exploit), replace a file running as a privileged service with a malicious file, and/or take advantage of the application logic to break out of the application and spawn another process having higher privileges.

Current systems for detecting and preventing privilege escalation attacks generally rely on verifying security tokens and/or large databases of known malware and exploit signatures. In the rapidly morphing landscape of computer threats and the increasing reliance on computers for daily operations, it is critical for the detection of privilege escalation attacks to be quick and effective without relying on limited perspectives (e.g., security tokens) or third parties (e.g., commercial malware databases).

SUMMARY

In accordance with one embodiment of the present disclosure, a method for privilege escalation monitoring includes initiating a learning mode, recording application attributes of one or more applications on a host system to an application repository, recording process attributes of one or more running processes on the host system to an access repository, recording application programming interface (API) calls of the one or more running processes on the host system to an API repository, and terminating the learning mode. The method also includes initializing a protecting mode, identifying running processes on the host system based on records in the application repository, determining whether the identified running processes have system access violations based at least in part on the application repository, determining whether the identified running processes have file permission escalations based at least in part on the access repository, determining whether the identified running processes have failed privileged API calls based at least in part on the API repository, generating an alert, in response to determining that the identified running processes have system access violations, file permission escalations, failed privileged API calls, or combinations thereof, and terminating an offending process corresponding to the alert.

In accordance with another embodiment of the present disclosure, a system for privilege escalation monitoring includes a processor, a non-transitory storage medium, and machine-readable instructions stored in the non-transitory storage medium. The machine-readable instructions, when executed by the processor, cause the processor to perform operations including initiating a learning mode, recording application attributes of one or more applications on a host system to an application repository, recording process attributes of one or more running processes on the host system to an access repository, recording application programming interface (API) calls of the one or more running processes on the host system to an API repository, and terminating the learning mode. The machine-readable instructions further cause the processor to perform operations including initializing a protecting mode, identifying running processes on the host system based on records in the application repository, determining whether the identified running processes have system access violations based at least in part on the application repository, determining whether the identified running processes have file permission escalations based at least in part on the access repository, determining whether the identified running processes have failed privileged API calls based at least in part on the API repository, generating an alert, in response to determining that the identified running processes have system access violations, file permission escalations, failed privileged API calls, or combinations thereof, and terminating an offending process corresponding to the alert.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
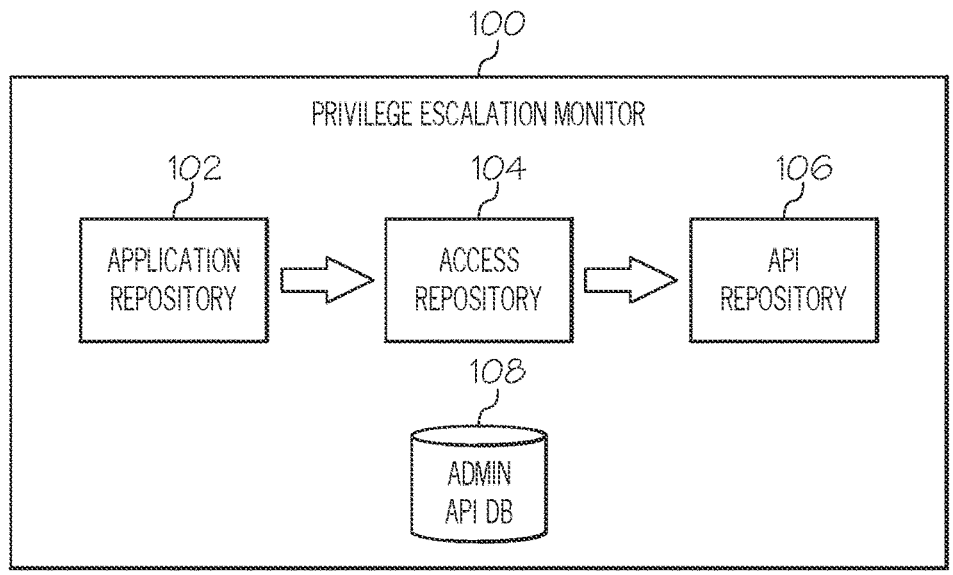
FIG. 1 schematically depicts an illustrative privilege escalation monitor, according to one or more embodiments shown and described herein.

The methods and systems for privilege escalation attack monitoring and prevention disclosed herein examine file permissions, process/thread rights, file hashes, process/DLL parent-child relationships, application programming interface (API) calls, and other metadata for processes running on a computer. Embodiments may operate locally and may be performed without access to large repositories of known malware/exploit signatures, as most commercial security programs do. The privilege escalation monitors disclosed herein assume an OS that has segments access to APIs and file access based on permission levels, wherein the permission levels have at least user permission for general users, administrator permission for system administrators that have unrestricted access, and system permission for the system that has access to OS-level APIs. The privilege escalation monitors disclosed herein also assume that an OS that distributes work on a hardware level based on applications, processes, and threads, where an application comprises one or more processes and a process comprises one or more threads. In other words, a thread is the basic unit to which the OS allocates processor time and runs in the context of a process, alone or with other threads, and a process is an executing application, alone or with other processes. An example of an operating system that follows the foregoing assumptions is the Microsoft Windows OS, which will be used as an example for the discussion of the privilege escalation monitor. It should be noted, however, that the present disclosure is not limited to the Microsoft Windows OS, but may also include any other OS that is structured according to the foregoing assumptions.

The privilege escalation monitors of the present disclosure include two modes: a learning mode and a protecting mode. In the learning mode, embodiments monitor behavior by watching each application and process; fingerprinting each application and process to establish a baseline by gathering its DLLs, hashes, file locations, file permissions, and process/thread rights; enumerating the Windows API calls made by each process; and storing the fingerprinted information into an application repository for applications and an access repository for processes, and storing the API calls into a process/DLL API repository.

After a period of time, the privilege escalation monitor may initiate a protecting mode. In the protecting mode, the privilege escalation monitor determines whether a process was anticipated by checking for its presence in the application repository, which was populated during the learning mode. If the process is present in the application repository, the system enumerates the process's OS API calls and determines whether the API call was one that requires heightened (e.g., administrator or system level) privileges. If the process had administrator privileges during the learning mode but no longer has permission to call a system API, the system may generate an alert for process system access violation. If the process successfully calls a privileged API (i.e., an API in the privileged API database (DB) requiring administrator or system privileges) and the permission level for the process is different from the permission level recorded during the learning mode, then the system may generate an alert for file permission escalation. If the process unsuccessfully calls a privileged API, then the system may generate an alert for a failed privileged API call.

Referring now to FIG. 1, an illustrative privilege escalation monitor 100 is schematically depicted. The privilege escalation monitor 100 facilitates the monitoring and prevention of privilege escalation attacks on a computer system. The privilege escalation monitor 100 may contain an application repository 102, an access repository 104, an API repository 106, and a privileged API DB 108.

The application repository 102 may be any kind of storage such as, e.g., a database, a spreadsheet, a text file, or any other data storage format. The application repository 102 may record information concerning applications stored on the computer system to establish a baseline metric of application attributes such as, e.g., application names, DLLs, hashes, canonical paths, file permissions, process/thread rights, access privileges, and other application attributes.

The access repository 104 may also be any kind of storage such as, e.g., a database, a spreadsheet, a text file, or any other data storage format. The access repository 104 may record information concerning processes running on the computer system to establish a baseline metric of process attributes such as, e.g., process names, corresponding application names, DLLs, hashes, canonical paths, file permissions, process/thread rights, access privileges, and other process attributes.

The API repository 106 may also be any kind of storage such as, e.g., a database, a spreadsheet, a text file, or any other data storage format. The API repository 106 may record information concerning APIs being called on the computer system to establish a baseline metric of API calls.

The privileged API DB 108 may also be any kind of storage or integrated with the API repository 106. The privileged API DB 108 is a reference table that that may contain a list of API calls that require "administrator" level privileges and a list of API calls that require "system" level privileges, or the equivalent in a non-Windows system. The API calls listed in the privileged API DB 108 cannot be successfully completed unless the process has the correct permissions to do so due to OS constraints. It should be understood that the privileged API DB 108 is referred to as a database rather than a repository because it is primarily used as a static reference table unlike the application repository 102, access repository 104, and API repository 106 that are herein referred to as "repositories" because they are more dynamic and routinely updated.

The privilege escalation monitor 100 may be installed on any suitable computing device. For example, the computing device may be a desktop computer, a server, a laptop, a tablet, a smartphone, an emulated virtual computing device on any appropriate host hardware, and any other computing device. The operating system may run on the computing device to provide a software environment for the execution of applications and their related processes. A software environment may provide resources such as installed applications, system services, drivers, files, and the like. The operating system may have a security model wherein access and/or execution privileges are defined on a per-user level. The operating system may define privileges according to users or groups of users for determining authorization. The operating system may store login credentials for the users for determining authentication. The privilege escalation monitor 100 may be a program installed on an operating system, wherein the program may be a process, a service, a daemon, or combinations thereof. The privilege escalation monitor 100 may run with privileges sufficient to view the attributes of each application and process and generate alerts to a system log but not with privileges such that it could be exploited by a malicious actor to be used against the computer device.

Figure 2:
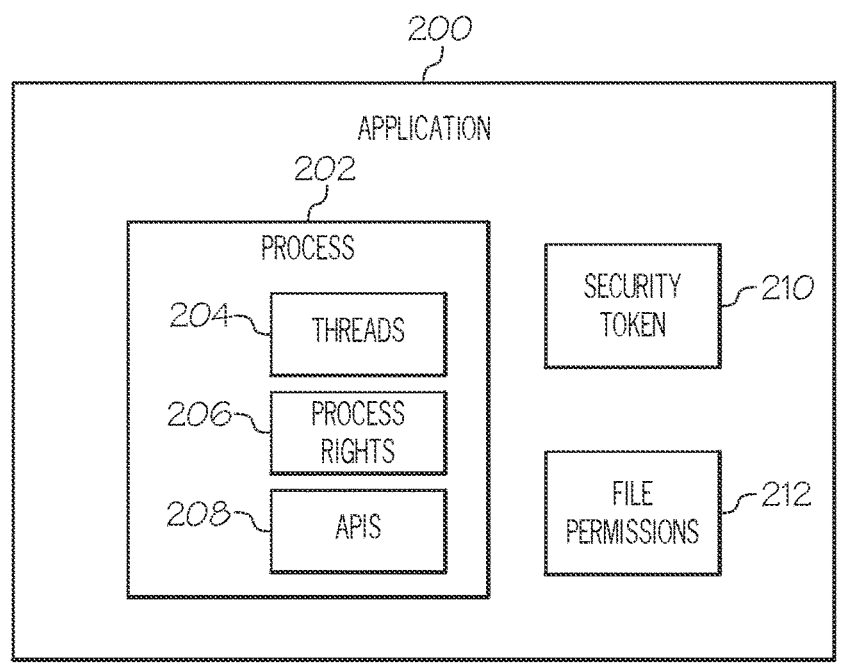
FIG. 2 schematically depicts an illustrative computer application (or "application"), according to one or more embodiments shown and described herein.

Referring now to FIG. 2, an illustrative computer application 200 is schematically depicted. A computer application 200 (or "application") is a program designed to run on a computer system for use by the user of the computer. An application 200 may contain a security token 210. A security token 210 describes the security context of the application 200, which a process 202 and/or thread 204 of an application 200 may inherit. The security token 210 may include the identity and user privileges of the user account associated with the process 202 and/or thread 204 of the application 200. An application 200 may also contain file permissions 212 that are used to define access to files and/or folders of an application 200 and its processes 202.

Every application 200 that is opened on a system creates at least one process 202. A process 202 is an instance of a particular application, and a single application 200 may have several processes 202 as it may rely on several applications. For example, a web browser, such as Google Chrome, is an application that may have several processes running at once, with each tab being separate processes of the same web browser application. As another example, a word processor, such as Microsoft Word, is an application that may run from a single process, regardless of how many word processing documents are open. Each process 202 may have one or more threads 204, representing a basic unit to which the OS will allocate time that can execute any part of a process's code. Each process 202 may also have one or more process rights 206. Process rights 206 give the process 202 access to particular parts of the OS, including other processes 202 or threads 204, and defines the ability of the process 202 to conduct particular functions. Each process 202 may further have one or more API calls 208. An API is a set of application programming interfaces available in the operating systems and applications 200 for operating systems and applications 200 to communicate between each other. For instance, in the Microsoft Windows operating system, processes 202 and other executables (e.g., DLLs) can interact with the Windows OS kernel using Windows APIs to perform OS-specific functions, such as create new threads, output graphics content to output devices, create and manage user interfaces, and the like.

Figure 3:
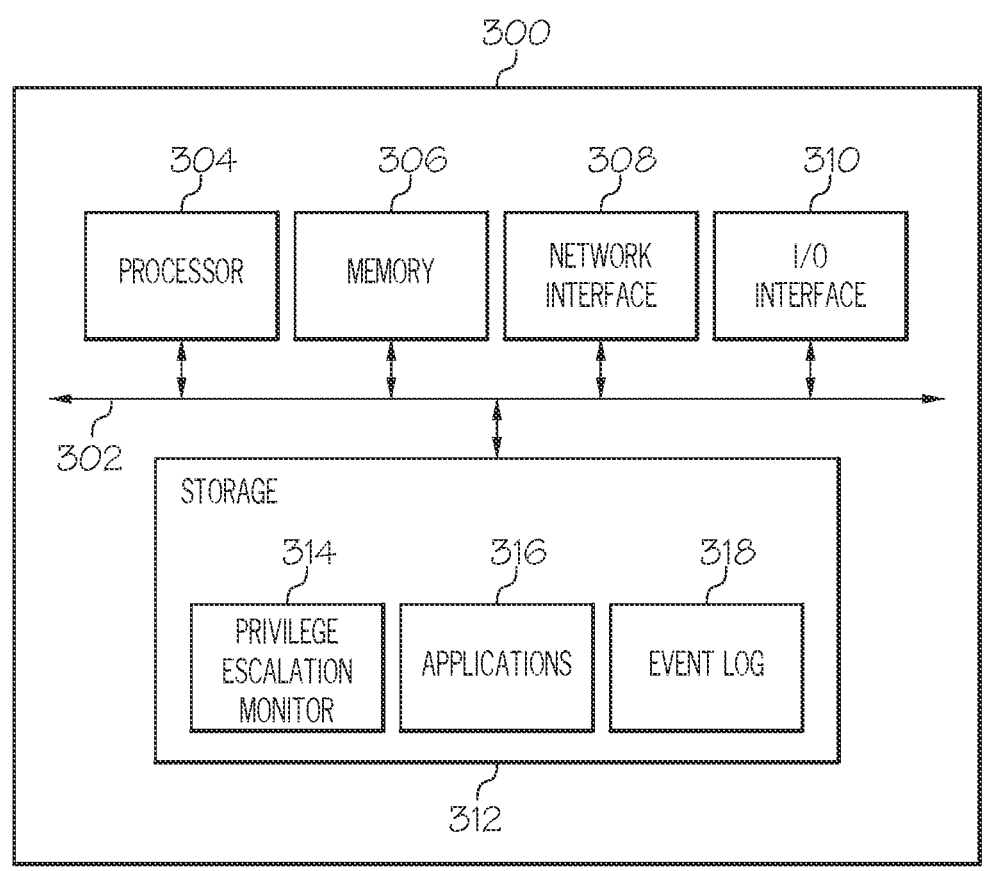
FIG. 3 schematically depicts an illustrative computer system, according to one or more embodiments shown and described herein.

Referring now to FIG. 3, an illustrative computer device 300 is schematically depicted. The computer device 300 may comprise a communication path 302, a processor 304, memory 306, network interface hardware 308, I/O interface hardware 310, and storage hardware 312. The storage hardware 312 may include a privilege escalation monitor 314, applications 316, and an event log 318.

The processor 304 may include one or more processors that may be any device capable of executing machine readable and executable instructions. Accordingly, each of the one or more processors of the processor 304 may be a controller, an integrated circuit, a microchip, or any other computing device. The processor 304 is coupled to the communication path 302 that provides signal connectivity between the various components of the computer device 300. Accordingly, the communication path 302 may communicatively couple any number of processors 304 with one another and allow them to operate in a distributed computing environment. Specifically, each processor 304 may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

The communication path 302 may be formed from any medium that is capable of transmitting a signal such as, e.g., conductive wires, conductive traces, optical waveguides, and the like. In some embodiments, the communication path 302 may facilitate the transmission of wireless signals, such as Wi-Fi, Bluetooth, Near-Field Communication (NFC), and the like. Moreover, the communication path 302 may be formed from a combination of mediums capable of transmitting signals. In one embodiment, the communication path 302 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory hardware 306 is communicatively coupled to the communication path 302 and may contain one or more memory modules comprising RAM, ROM, flash memories, hard drives, or any device capable of storing machine readable and executable instructions such that the machine readable and executable instructions can be accessed by the processor 304. The machine readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory hardware 306. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The data storage hardware 312 is communicatively coupled to the communication path 302 and may contain one or more persistent storage devices such as solid state drives, hard disk drives, or any other device capable of persistent, non-transitory data storage. The data storage hardware 312 may store data used by various components of the computer device 300 such as a privilege escalation monitor 314, applications 316, and an event log 318. It should be understood that the data storage hardware 312 may reside local to and/or remote from the computer device 300, and may be configured to store one or more pieces of data for access by the computer device 300 and/or other components. Other data to perform the functionalities described herein may also be stored in the data storage hardware 312 (e.g., cached data, user session data, etc.).

The network interface hardware 308 is communicatively coupled to the communication path 302. The network interface hardware 308 can be any device capable of transmitting and/or receiving data via a network or other communication mechanisms. Accordingly, the network interface hardware 308 can include a communication transceiver for sending and/or receiving any wired or wireless communication. For example, the network interface hardware 308 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices. The network interface hardware 308 may communicatively connect the computer device 300 to external systems, such as external devices, via a network. The network may be a wide area network, a local area network, a personal area network, a cellular network, a satellite network, and the like. External devices may include computer devices that operate beyond the computer device 300 that may be examined by the computer device 300 in a client-server mode, where end-user computers are clients and the computer device 300 is a centralized privilege escalation monitoring server.

It should be understood that the components illustrated in FIG. 3 are merely illustrative and are not intended to limit the scope of this disclosure. More specifically, while the components in FIG. 3 are illustrated as residing within computer device 300, this is a non-limiting example. In some embodiments, one or more of the components may reside external to computer device 300. In some embodiments, the computer device 300 may exist as a virtual machine operating within a host machine alongside other virtual machines, each of which shares the same computing resources belonging to the host machine.

Figure 4A:
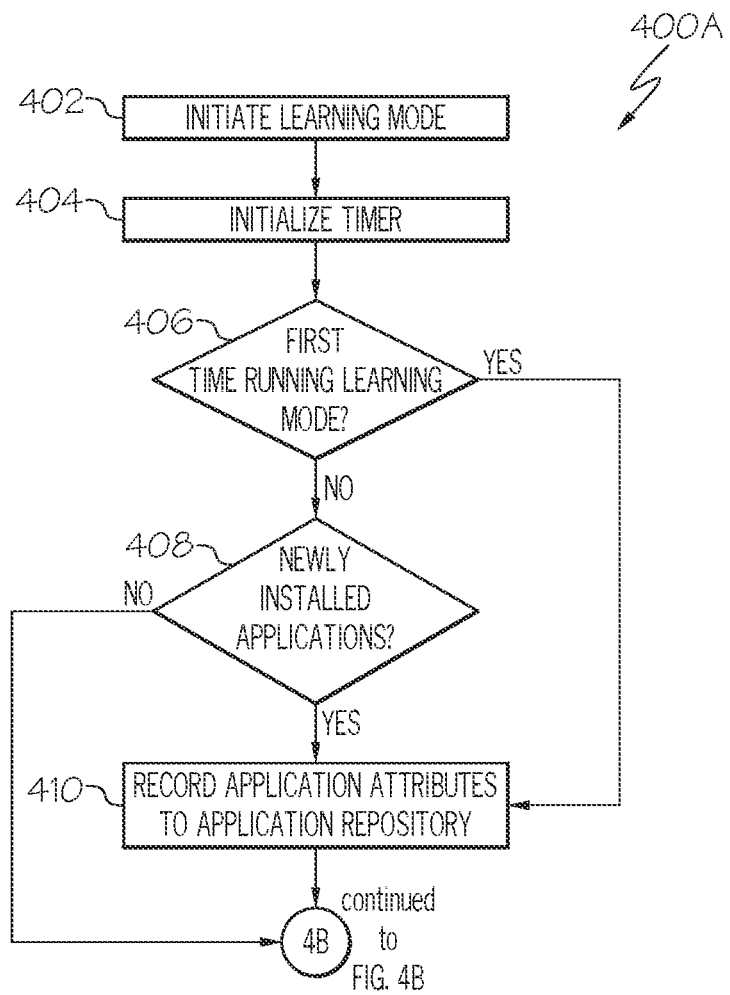
FIG. 4A depicts a flowchart of an illustrative method for populating an application repository in a learning mode, according to one or more embodiments shown and described herein.

Referring now to FIG. 4A, a flowchart of an illustrative method 400a for populating an application repository in a learning mode is depicted. In the learning mode component of method 400a, a computer system monitors the behavior of the processes and/or child processes of itself and/or another computer system by fingerprinting the processes and enumerating the OS API calls that they make. Fingerprinting may include gathering information regarding a process such as process name, DLLs, hashes, location in the file system, file permissions, process rights, and process attributes to establish a baseline reading of normal operation.

The method 400a begins at block 402 where the learning mode is initiated. Initiation of the learning mode may include preparing the computing environment to fingerprint processes and monitor API calls. Preparing the computing environment may include momentarily freezing processes so that processes may be fingerprinted at a particular moment in time, identifying processes that may be fingerprinted and/or monitored, and/or determining a timer length for the learning mode. Once the computing environment is prepared for the learning mode, the process may move to block 404.

At block 404, a timer is initialized. The timer may be initialized as a service, daemon, or other background process that cannot be interacted with by the user. The timer may be set to the timer length as determined in block 402. The timer length may be long enough so as to reduce the potential amount of false positive alerts that may occur in protecting mode. A false positive alert may arise if insufficient data is gathered in the learning mode so that the protecting mode does not have enough information to determine whether a process should be considered safe. If the protecting mode cannot determine that the process is considered safe, the protecting mode may err on the side of caution and generate an alert that it otherwise may not have if sufficient information was gathered in the learning mode. On the other hand, the longer that the method 400a is in learning mode rather than protecting mode, the more opportunity there is for a privilege escalation attack to occur without detection. After the timer has been initialized at block 404, the timer may begin and the method 400a may move to block 406.

At block 406, it is determined whether the learning mode is running for the first time. If it is the first time running the learning mode, the method 400a may move to block 410 where the privilege escalation monitor may traverse through and identify each application for building up a baseline amount of information for use in the protecting mode. If not, the method 400a may move to block 408. The learning mode and protecting mode may be run simultaneously after the initial run of the learning mode to reduce the amount of time the protecting mode is not run. If the learning mode and the protecting mode are run simultaneously in the initial run of the learning mode, the protecting mode may generate an alert for running processes that have not been fingerprinted, which may be most processes. However, the learning mode and protecting mode may be run simultaneously by generating a time-based log of fingerprinting data and offsetting the time at which the learning mode and protecting mode are run. For example, a learning mode may fingerprint applications at times A and B. While at time B, the protecting mode may begin to perform its evaluations based on data gathered from the learning mode at time A. Running the learning mode and protecting mode at an offset allows for information about new processes to be current while reducing the downtime of the protecting mode.

At block 408, newly installed applications are identified. Because fingerprinting each application may be time-consuming, it need not be performed each time the learning mode method 400a is run. To shortcut subsequent runs of the learning mode method 400a, the learning mode method 400a may check for newly installed applications and fingerprint only those instead because the newly installed applications likely would not have been fingerprinted in previous iterations of the learning mode method 400a. If the learning mode method 400a has been previously run and no newly installed applications are found, then the method 400a may proceed to method 400b.

At block 410, application attributes are recorded to an application repository. The applications identified in blocks 406 or 408 may be analyzed to enumerate attributes relating to the applications. Such attributes may include application names, corresponding process names, process/thread rights, hashes, canonical paths, corresponding DLLs, and other application attributes. The enumerated application attributes may be recorded to the application repository for establishing a baseline measurement for what is considered normal on the computer system. The enumerated application attributes may be stored as records in a database for future reference. The application repository may be the application repository as shown in FIG. 1, where the application repository 102 exists within the privilege escalation monitor 100. The protecting mode may rely on this baseline measurement to determine if and/or when a privilege escalation attack has occurred. After application attributes have been recorded to the application repository, the method 400a may move to method 400b.

Figure 4B:
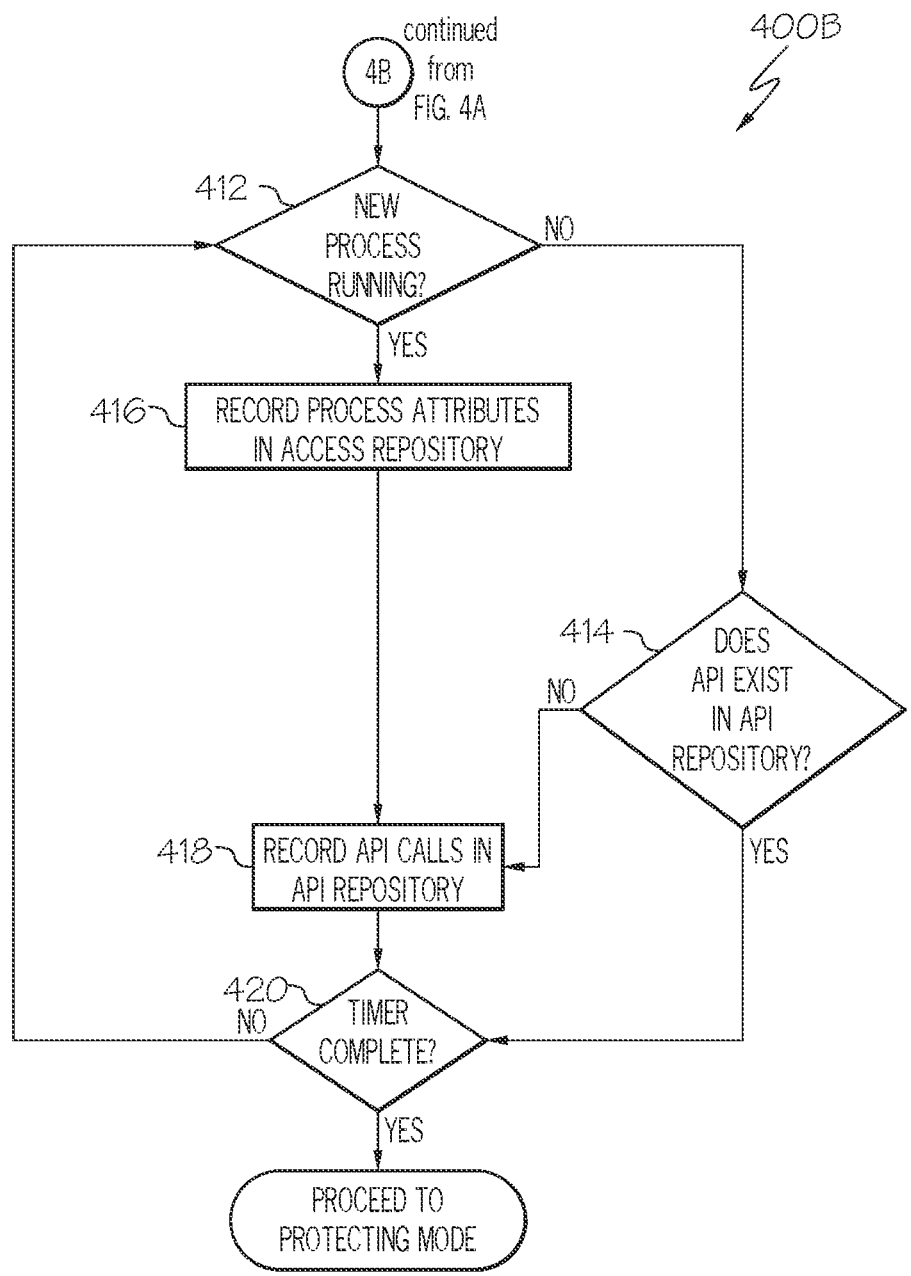
FIG. 4B depicts a flowchart of an illustrative method for populating an access repository and API repository in the learning mode, according to one or more embodiments shown and described herein.

Referring now to FIG. 4B, a flowchart of an illustrative method 400b for populating an access repository and API repository in the learning mode is depicted. Where method 400a was for establishing a baseline of what the computer system may expect from applications installed on the computer system, the access repository is for storing what an application actually does on the computer system in terms of its processes and the API repository is for storing what an application actually does on the computer system in terms of how it interacts with other parts of the systems (e.g., the OS and other applications). The method 400b begins by determining whether a new process is running at block 412. If an application has not been run before, then its processes likely have not been run before. If a new process has not begun, then the method 400b may continue checking for new processes until one is found. Otherwise, the method 400b may proceed to block 414. Part of the application attributes that was tracked in method 400a may have included the processes that the application may run. To determine whether the new process exists in the application repository, the records of the application repository are searched to determine whether the process's attributes can be found. The process's attributes may include process name, process rights, hash, and/or file location. If the process's attributes cannot be found in the application repository, then the method 400b may move to block 420. If the process's information can be found in the application repository, then the method 400b may proceed to build the access repository at block 416 and the API repository at block 418.

At block 414, the privilege execution monitor determines whether API's called by the process can be found in the API repository. To determine whether the new API exists in the API repository, the records of the API repository are searched to determine if a match is found. If a match cannot be found in the API repository then the method 400b may move to block 420. If the process's information can be found in the application repository, then the method 400b may proceed to update the API repository at block 418.

At block 416, the process's attributes may be recorded in the access repository. The access repository stores attributes of the processes that run from an application and perform work for the application. The access repository may create one or more records for the new process and include information such as its name, hashes, canonical paths, file permissions, process rights, access token, and other process metadata as well as its corresponding application name and DLLs. Where the application repository is directed towards keeping records of applications, the access repository is directed toward keeping records of processes, which typically stem from applications. At least one item that may be different between records in the access repository as compared to the application repository is the access tokens. An access token is a digital security object (e.g., in Windows, a "Token" object type) that encapsulates the security identity of a process or thread. The access token may contain information such as an identifier, a user identifier, and privileges. Recording the access token of a process in the access repository may allow for comparison with a subsequent access token of the same process to determine whether the process has been tampered with.

At block 418, the process's API calls may be recorded in the API repository. The API repository stores the API calls made by the new process, typically to interact with the OS and/or other applications (internal and/or external to the OS). The API repository may create one or more records for the new process and include information such as the process's name, hash, and access privileges as well as the APIs that are called during the learning mode.

At block 420, the privilege escalation monitor checks the timer to determine whether the timer has completed. Because the learning mode runs according to a timer, the computer system may continue to collect information regarding the processes until the timer has completed, to ensure that sufficient data is gathered and reduce the potential for false positive alerts in the protecting mode. In some embodiments, the information recorded in the access repository and/or the API repository at blocks 416 and 418, respectively, may not all be collected in a single moment but may be gathered piecemeal in a series of iterations until the timer has completed. In some embodiments, if the timer is not complete, the computer system may also go to method 400a to gather more information about the applications installed on the computer system. After the method 400b is completed, the learning mode may be completed and the privilege escalation monitor may switch to protecting mode.

Figure 5A:
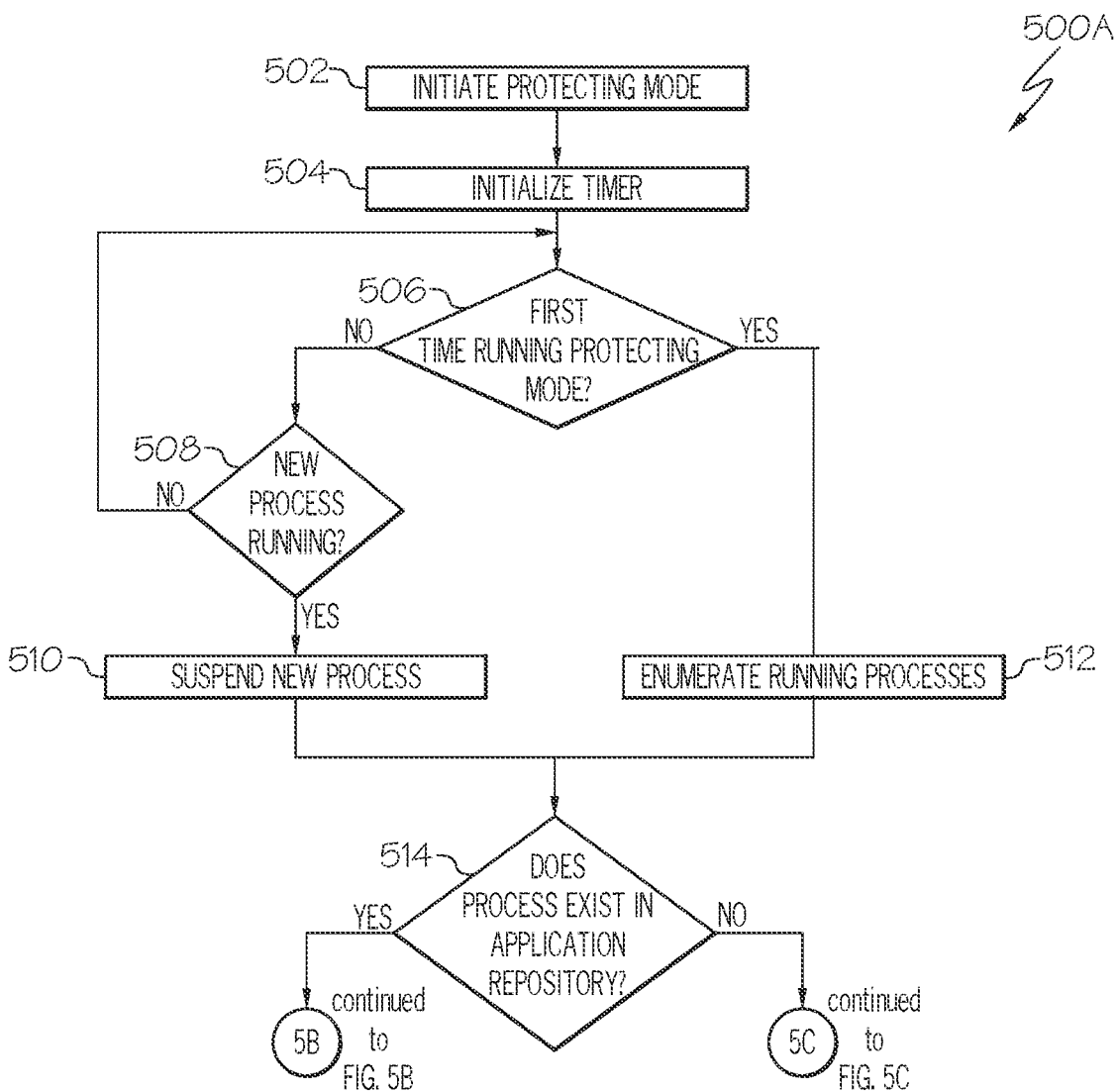
FIG. 5A depicts a flowchart of an illustrative method for initiating a protecting mode, according to one or more embodiments shown and described herein.

Referring now to FIG. 5A, a flowchart of an illustrative method 500a for initiating a protecting mode is depicted. In the protecting mode, the privilege escalation monitor monitors the processes and/or child processes of the host computer system and/or another computer system to determine whether a process has been illegitimately modified. The method 500a begins at block 502 where the protecting mode is initiated. Initiation of the protecting mode may include preparing the application repository, the access repository, the API repository, and the privileged API DB so that they may be read from by the computer system. Initiation of the protecting mode may also include preparing an event log to be written to by the computer system (e.g., the event log 318 of FIG. 3). Initiation of the protecting mode may further include determining a timer length for the protecting mode. Once the computing environment is prepared for the protecting mode, the process may move to block 504.

At block 504, a timer is initialized. The timer may be initialized as a service, daemon, or other background process that cannot be interacted with by the user. The timer may be set to the timer length as determined in block 502. The duration of the protecting mode may arbitrary or random to prevent the methods described herein from being gamed. Additionally or alternatively, the duration of the timer may be based on the amount of data collected in the learning mode, the amount of processes running, the duration of the learning mode, and/or other factors that may impact the likelihood of false positive alerts being generated. After the timer has been initialized at block 504, the timer may begin and the method 500a may move to block 506.

At block 506, it is determined whether the protecting mode is running for the first time. If it is the first time running the protecting mode, the process may move to block 512 where the protecting mode may enumerate running processes for analysis. If not, the method 500a may move to block 508 where the protecting mode may identify new running processes. If any new processes are identified, the method 500a may move to block 510 where the protecting mode may suspend the identified new processes. In some embodiments, if it is not the first time that the protecting mode has run and there are no new processes running, the method 500a may remain idle until the end of the timer to reduce computing resources used in the method 500a.

At block 514, it is determined whether the enumerated processes from block 512 or the suspended new processes from block 510 exist in the application repository. A process exists in the application repository for purposes of block 514 if its name, file location, hash, and corresponding DLLs are present in a record in the application repository. A process that exists in the application repository indicates that the process was anticipated to be run by an application installed on the computing device. If the process does not exist in the application repository, the method may go directly to method 500c, where the process may be terminated. If the process does exist in the application repository, the method may go to method 500b, where the process is analyzed for determining whether any alerts need to be raised.

Figure 5B:
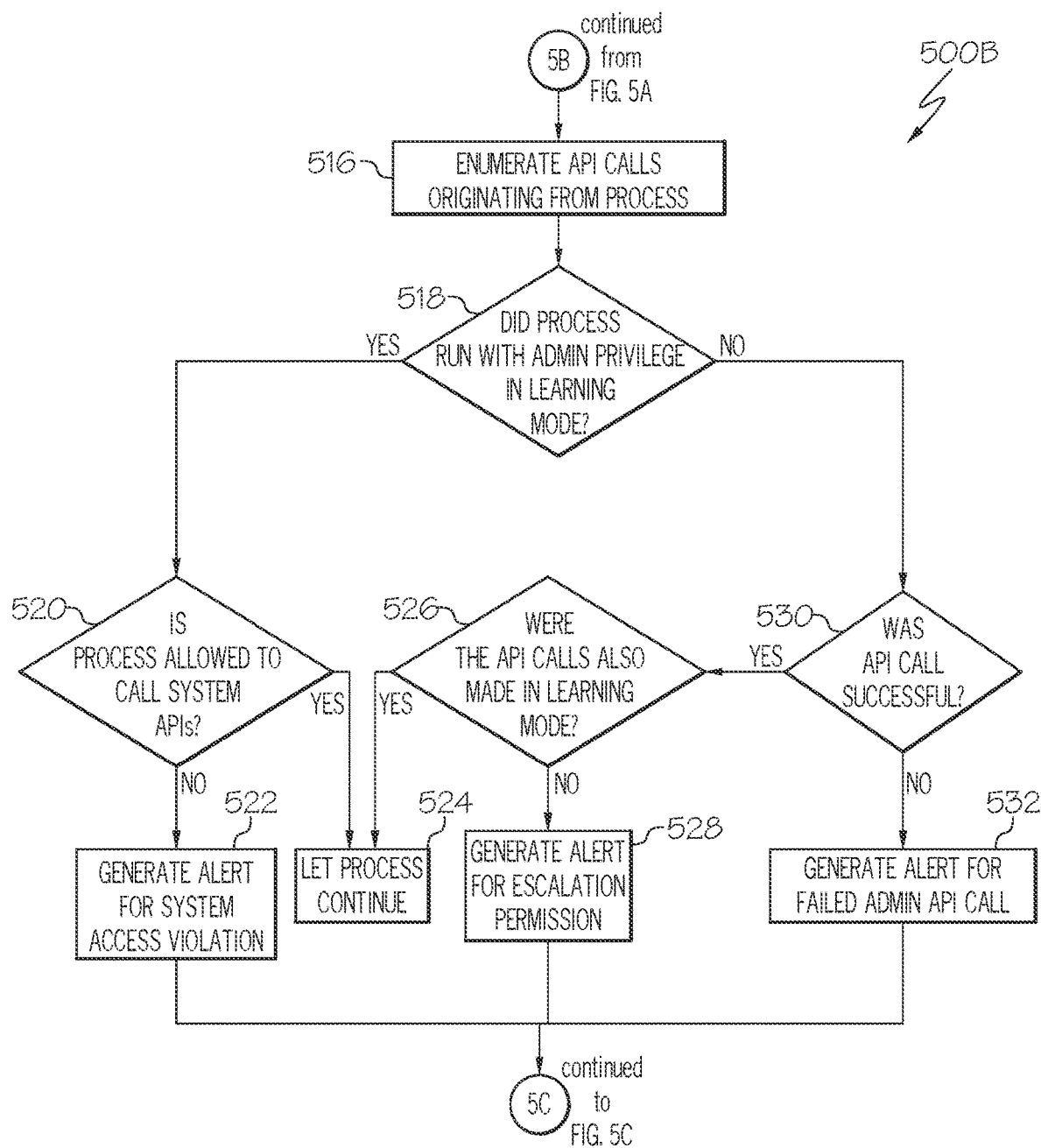
FIG. 5B depicts a flowchart of an illustrative method for analyzing processes in the protecting mode, according to one or more embodiments shown and described herein.

Referring now to FIG. 5B, a flowchart of an illustrative method 500b for analyzing processes in the protecting mode is depicted. Where method 500a was for initiating the protecting mode and determining which processes to analyze, method 500b is for determining whether the processes have any illegitimate modifications such as improper system access, altered file permissions, and/or failed administrator API calls. Method 500b begins at block 516 where API calls originating from processes being analyzed are enumerated. API calls may be those gathered in the learning mode and stored in the API repository.

At block 518, it is determined whether the process being analyzed ran with administrator privileges in the learning mode. The privileges of the process in learning mode may be determined by checking the API repository to determine if any APIs called by the process were APIs that require administrator privileges to be called (e.g., APIs in the privileged API DB). The privileges of the process in learning mode may also be determined by checking the access repository to reference the record of the process. If the process being analyzed ran with administrator privileges in the learning mode, the method 500b may proceed to block 520.

At block 520, the privilege escalation monitor determines whether the process being analyzed is allowed to call system APIs. Determining whether a process is allowed to call system APIs may involve checking the permissions of the process. The permissions of the process may be found in the access repository. Determining whether a process is allowed to call system APIs may also involve comparing the APIs that the process called, as found in the API repository, with the privileged API DB. If the APIs that the process called include system APIs from the privileged API DB, then the process may be allowed to call system APIs. If it can be determined that the process is allowed to call system APIs, the method 500b may move to block 524 where the process may continue running, or be resumed if previously suspended in block 510. Otherwise, the method 500b moves to block 522 where an alert for system access violation is generated.

If at block 518 the process being analyzed did not run with administrator privileges in the learning mode, the method 500b may proceed to block 530. At block 530, the privilege escalation monitor determines whether the privileged API calls made by the process were successful. Privileged APIs are those that require administrator or system level privileges, as laid out in the privileged API DB. To determine what privileged API calls were made, the record of the API repository corresponding to the process at issue may be compared against the privileged API DB. To determine whether the administrator APIs called by the process being analyzed were successful, OS logs (e.g., Windows Event Log) may be referenced to see if the OS prevented the execution of an API call due to improper permission of the process. In some embodiments, the API repository records whether an API was successfully called when recording API calls in the API repository at block 418. If the process called an API, the API is in the privileged API DB, and the API was not successfully called, the method 500b may proceed to block 532, where a failed administrator API call is generated to indicate that a process was attempting to call a privileged API that did not have access to. Otherwise, the method 500b may proceed to block 526.

At block 526, it is determined whether the privileged API calls made by the process were also made during the learning mode. To determine whether the privileged API calls made by the process were also made during the learning mode, entries in the access repository are filtered to find entries that relate to the process and to the privileged API calls. If the records in the access repository indicate that the process successfully called the privileged APIs, then the method 500b may proceed to block 524, where the process is permitted to continue, or the process is resumed from suspension if suspended in block 510. Otherwise, the method 500b moves to block 528 where a permission escalation alert is generated. Once an alert has been generated, the method 500b may move to method 500c. In some embodiments, once an alert has been generated, the process causing the alert may be terminated and the privilege escalation monitor may continue to analyze the remaining processes.

Figure 5C:
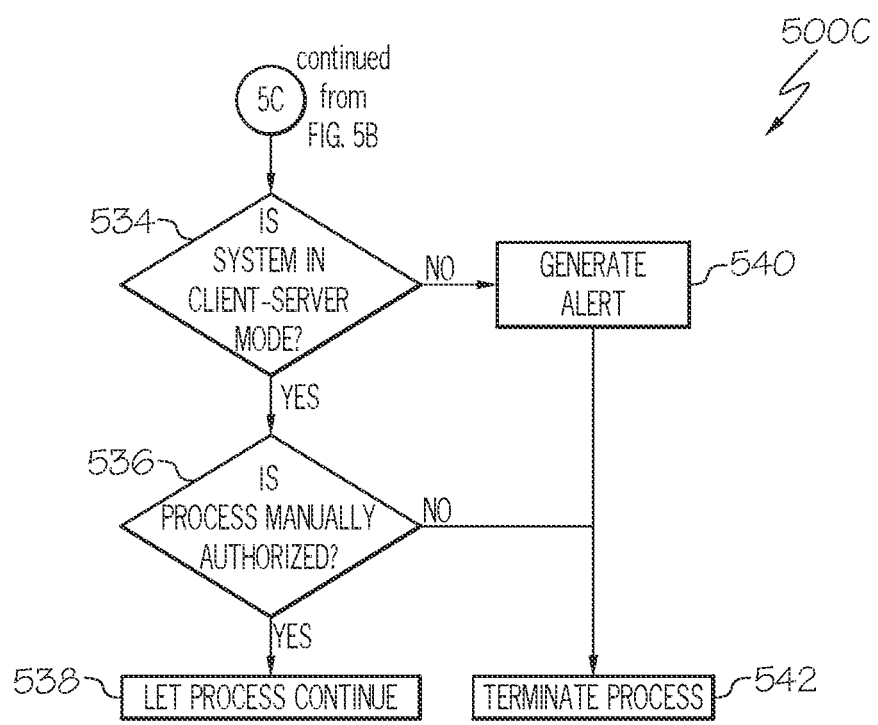
FIG. 5C depicts a flowchart of an illustrative method for terminating a protecting mode, according to one or more embodiments shown and described herein.

Referring now to FIG. 5C, a flowchart of an illustrative method for terminating a protecting mode is depicted. Instead of automatically terminating suspicious processes that result in alerts being generated, a server computer system performing the methods described herein on a client computer system may have extra options for a user of the server computer system to determine how to handle the alert. Thus, at block 534, it is determined whether the computer system performing the methods 500a-500c is operating in client-server mode and acting as the server. The client may be a computer system as described in FIG. 3. The server may be a computer system like the client but may also be used by system administrators to keep computer systems in a network protected from privilege escalation attacks. If the computer system is not operating in client-server mode, then the computer system may proceed to block 540 where the alert generated in method 500b is output into an event log, such as the event log 318 depicted in FIG. 3 and then proceed to block 542 where the process is terminated. Otherwise, the method 500c proceeds to block 536.

At block 536, the privilege escalation monitor determines whether the offending process is manually authorized. Because it has already been determined that the computer system performing the methods 500a-500c is a server computer system, the system administrator using the server computer system may manually review the offending processes that have generated an alert and/or circumstances surrounding the offending processes. The system administrator can review the application repository, access repository, and/or API repository to determine if the alert was a false positive alert. The system administrator may also evaluate the privileged API DB to determine whether all appropriate privileged APIs are contained in the privileged API DB to further determine if the alert was a false positive alert. If the system administrator manually authorizes the suspicious process from the remote server computer, the method 500c may proceed to block 538 where the process continues, or is resumed if suspended in block 510. Otherwise, the method 500c proceeds to block 542 where the process is terminated. In some embodiments, the method 500c may return to method 500a to continue to evaluate each process until the timer initialized and started at block 504 is completed. After the timer is completed, the protecting mode may end and the privilege escalation monitor may return to learning mode to update the information stored in the application repository, access repository, and API repository.

It should now be understood that the present disclosure relates to methods and systems for privilege escalation attack monitoring and prevention. A privilege escalation monitor may be installed on a client and/or a server computer device. The privilege escalation monitor may have two modes: a learning mode and a protecting mode. In the learning mode, the privilege escalation monitor may collect application attributes in an application repository, process attributes in an access repository, and API calls made by processes in an API repository. In the protecting mode, determine whether running processes identified in the learning mode have system access violations, file permission escalations, and/or failed privileged API calls and generate a corresponding alert that may result in the process being logged and terminated.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for privilege escalation monitoring comprising:
    initiating a learning mode;
    recording application attributes of one or more applications on a host system to an application repository;
    recording process attributes of one or more running processes on the host system to an access repository;
    recording application programming interface (API) calls of the one or more running processes on the host system to an API repository;
    terminating the learning mode;
    initializing a protecting mode;
    identifying running processes on the host system based on records in the application repository by:
        determining whether a process is running on the host system;
        determining whether a set of process attributes, belonging to the process, matches a record in the application repository, wherein application attributes includes a name, a hash, a process right, a canonical path, a DLL, or combinations thereof;
        generating an alert, in response to determining that the process is not running on the system, the set of process attributes does not match a record in the application repository, or combinations thereof;
        enumerating a set of API calls originating from the process, in response to determining that the process is running on the system and the set of process attributes matches a record in the application repository; and
        determining whether the process ran with an administrator privilege in the learning mode based on the matched record in the application repository;
    determining whether the identified running processes have system access violations based at least in part on the application repository;
    determining whether the identified running processes have file permission escalations based at least in part on the access repository;
    determining whether the identified running processes have failed privileged API calls based at least in part on the API repository;
    generating an alert, in response to determining that the identified running processes have system access violations, file permission escalations, failed privileged API calls, or combinations thereof; and
    terminating an offending process corresponding to the alert.

2. The method of claim 1, wherein determining whether the identified running processes have system access violations and generating an alert comprises:
    determining whether the process is permitted to call system APIs by comparing the set of API calls to a list of privileged APIs; and
    generating an alert in response to determining that the process ran with an administrator privilege in the learning mode and determining that the process is not permitted to call system APIs.

3. The method of claim 1, wherein determining whether the identified running processes have file permission escalations and generating an alert comprises:
    identifying privileged API calls from the set of API calls by comparing the set of API calls to a list of privileged APIs on the API repository;
    identifying one or more application attributes from the application repository corresponding to the identified running processes;
    identifying one or more process attributes from the access repository corresponding to the identified running processes;
    determining whether the one or more application attributes and the one or more process attributes have a privilege modification; and
    generating an alert in response to determining that the process did not run with an administrator privilege in the learning mode and determining that the one or more application attributes and the one or more process attributes have a privilege modification.

4. The method of claim 1, wherein determining whether the identified running processes have failed privileged API calls and generating an alert comprises:
    identifying privileged API calls from the set of API calls by comparing the set of API calls to a list of privileged APIs on the API repository;
    determining whether the identified privileged API calls contains an API call that was not successful; and
    generating an alert in response to determining that the process did not run with an administrator privilege in the learning mode and determining that the identified privileged API calls contains an API call that was not successful.

5. The method of claim 1, further comprising:
    initializing a first timer when initiating the learning mode; and
    terminating the learning mode and initiating the protecting mode, in response to the first timer ending.

6. The method of claim 1, further comprising:
    initializing a second timer when initiating the protecting mode; and terminating the protecting mode and initiating the learning mode, in response to the second timer ending.

7. The method of claim 1, wherein process attributes includes a name, a hash, a process right, a canonical path, a DLL, a file permission, a security token, or combinations thereof.

8. The method of claim 1, wherein recording process attributes of the one or more running processes on the host system to the access repository comprises:
   determining whether a process is running on the host system;
   determining whether a set of process attributes, belonging to the process, matches a record in the application repository; and
   recording the set of process attributes as a record in the access repository, in response to determining that the process is running on the host system and determining that the set of process attributes matches a record in the application repository.

9. The method of claim 8, wherein recording API calls of the one or more running processes on the host system to the API repository comprises:
   recording a set of API calls, originating from the process, as a record in the API repository, in response to determining that the process is running on the host system and determining that the set of process attributes matches a record in the application repository.

10. A system for privilege escalation monitoring comprising:
    a processor;
    a non-transitory storage medium; and
    machine-readable instructions stored in the non-transitory storage medium that, when executed by the processor, cause the processor to perform operations comprising:
    initiating a learning mode;
    recording application attributes of one or more applications on a host system to an application repository;
    recording process attributes of one or more running processes on the host system to an access repository;
    recording application programming interface (API) calls of the one or more running processes on the host system to an API repository;
    terminating the learning mode;
    initializing a protecting mode;
    identifying running processes on the host system based on records in the application repository by:
    determining whether a process is running on the host system;
    determining whether a set of process attributes, belonging to the process, matches a record in the application repository, wherein application attributes includes a name, a hash, a process right, a canonical path, a DLL, or combinations thereof;
    generating an alert, in response to determining that the process is not running on the system, the set of process attributes does not match a record in the application repository, or combinations thereof;
    enumerating a set of API calls originating from the process, in response to determining that the process is running on the system and the set of process attributes matches a record in the application repository; and
    determining whether the process ran with an administrator privilege in the learning mode based on the matched record in the application repository;
    determining whether the identified running processes have system access violations based at least in part on the application repository;
    determining whether the identified running processes have file permission escalations based at least in part on the access repository;
    determining whether the identified running processes have failed privileged API calls based at least in part on the API repository;
    generating an alert, in response to determining that the identified running processes have system access violations, file permission escalations, failed privileged API calls, or combinations thereof; and
    terminating an offending process corresponding to the alert.

11. The system of claim 10, wherein determining whether the identified running processes have system access violations and generating an alert comprises:
    determining whether the process is permitted to call system APIs by comparing the set of API calls to a list of privileged APIs; and
    generating an alert in response to determining that the process ran with an administrator privilege in the learning mode and determining that the process is not permitted to call system APIs.

12. The system of claim 10, wherein determining whether the identified running processes have file permission escalations and generating an alert comprises:
    identifying privileged API calls from the set of API calls by comparing the set of API calls to a list of privileged APIs on the API repository;
    identifying one or more application attributes from the application repository corresponding to the identified running processes;
    identifying one or more process attributes from the access repository corresponding to the identified running processes;
    determining whether the one or more application attributes and the one or more process attributes have a privilege modification; and
    generating an alert in response to determining that the process did not run with an administrator privilege in the learning mode and determining that the one or more application attributes and the one or more process attributes have a privilege modification.

13. The system of claim 10, wherein determining whether the identified running processes have failed privileged API calls and generating an alert comprises:
    identifying privileged API calls from the set of API calls by comparing the set of API calls to a list of privileged APIs on the API repository;
    determining whether the identified privileged API calls contains an API call that was not successful; and
    generating an alert in response to determining that the process did not run with an administrator privilege in the learning mode and determining that the identified privileged API calls contains an API call that was not successful.

14. The system of claim 10, further comprising:
    initializing a first timer when initiating the learning mode; and
    terminating the learning mode and initiating the protecting mode, in response to the first timer ending.

15. The system of claim 10, further comprising:
    initializing a second timer when initiating the protecting mode; and terminating the protecting mode and initiating the learning mode, in response to the second timer ending.

16. The system of claim 10, wherein recording process attributes of the one or more running processes on the host system to the access repository comprises:
   determining whether a process is running on the host system;
   determining whether a set of process attributes, belonging to the process, matches a record in the application repository; and
   recording the set of process attributes as a record in the access repository, in response to determining that the process is running on the host system and determining that the set of process attributes matches a record in the application repository.

17. The system of claim 16, wherein recording API calls of the one or more running processes on the host system to the API repository comprises:
   recording a set of API calls, originating from the process, as a record in the API repository, in response to determining that the process is running on the host system and determining that the set of process attributes matches a record in the application repository.

* * * * *